United States Patent Office 3,009,942
Patented Nov. 21, 1961

3,009,942
PRODUCTION OF TRICHLOROBENZOIC ACIDS
David X. Klein, Upper Montclair, and Theodore A. Girard, Wayne Township, Passaic County, N.J., assignors to Heyden Newport Chemical Corporation, New York, N.Y., a corporation of Delaware
No Drawing. Filed July 2, 1958, Ser. No. 746,073
8 Claims. (Cl. 260—465)

This invention relates to the production of trichlorobenzoic acids. More specifically it relates to the production of 2,3,6-trichlorobenzoic acid and to mixtures of trichlorobenzoic acids containing substantial amounts of the 2,3,6-isomer.

We have found that when 1,2,3,4-tetrachlorobenzene is reacted with cuprous cyanide in the presence of a cyclic basic compound the product is not the mixture of equal parts of 2,3,6-trichlorobenzonitrile and 2,3,4-trichlorobenzonitrile which one might expect to obtain but rather a mixture containing more than two parts of the 2,3,6-isomer for each part of the 2,3,4-isomer. Hydrolysis of this trichlorobenzonitrile mixture gives a mixture of trichlorobenzoic acids containing approximately the same proportion of the 2,3,6- and 2,3,4-isomers.

2,3,6-trichlorobenzoic avid is a very effective herbicide particularly when applied to fields of monocotyledonous crops to inhibit the growth of dicotyledonous weeds, whereas the 2,3,4-isomer and the other trichlorobenzoic acid isomers possess relatively little activity as selective herbicides. The present invention therefore provides a method of preparing trichlorobenzoic acid which contains a major amount of the desired isomer and a minor amount of the other isomers.

In accordance with this invention 1,2,3,4-tetrachlorobenzene is cyanated by heating it with cuprous cyanide and a cyclic basic compound to form a mixture of trichlorobenzonitriles. The trichlorobenzonitriles are then hydrolyzed to the corresponding trichlorobenzoic acids. Of the several procedures that can be used to effect hydrolysis, we prefer that in which the trichlorobenzonitriles are partially hydrolyzed by treatment with aqueous sulfuric acid in acetic acid to form trichlorobenzamides which are then hydrolyzed with nitrous acid to trichlorobenzoic acids.

This process can be represented by the following equations:

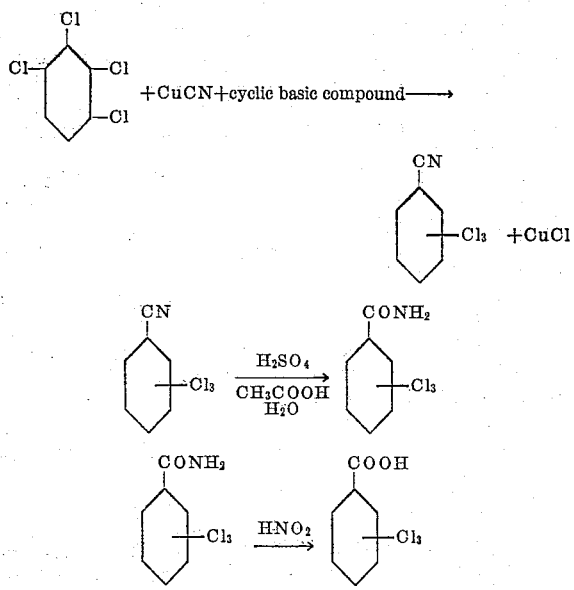

Surprisingly, the product resulting from this series of reactions contains more than 60% of the 2,3,6-isomer based on the total amount of trichlorobenzoic acid and generally contains approximately 2.0–2.5 parts of 2,3,6-trichlorobenzoic acid for each part of 2,3,4-trichlorobenzoic acid.

The tetrachlorobenzene used as the starting material may contain in addition to the 1,2,3,4-isomer small amounts of other tetrachlorobenzene isomers. Cyanation and hydrolysis also converts these other tetrachlorobenzene isomers to trichlorobenzoic acids. The arrangement of the chlorine atoms in the acids is dependent upon that of the chlorine atoms in the tetrachlorobenzene. The product obtained from technical grades of 1,2,3,4-tetrachlorobenzene may therefore contain, in addition to the 2,3,6- and 2,3,4-isomers, small amounts of 2,3,5-, 2,4,5-, and 2,4,6,-trichlorobenzoic acids.

The cyanation is carried out by heating 1,2,3,4, tetrachlorobenzene with cuprous cyanide and a cyclic basic compound at a temperature between approximately 165° C. and 195° C. The preferred reaction temperature is approximately 180° C. At temperatures below 165° C. cyanation takes place too slowly to be of commercial interest. At temperatures above 195° C. much of the organic material chars during the cyanation, and a very low yield of trichlorobenzoic acid is obtained.

The amount of cuprous cyanide used in the cyanation is approximately the stoichiometric quantity; that is, one mole or slightly more than that amount of cuprous cyanide is used for each mole of tetrachlorobenzene. The cuprous cyanide may be added as such at the start of the reaction or it may be formed in situ from, for example, an alkali metal cyanide and a copper salt.

The cyanation is carried out in the presence of a cyclic basic compound that will form with cuprous cyanide an addition compound that is soluble in the reaction mixture. Among the cyclic basic compounds that are capable of forming such addition compounds are benzonitrile, benzyl cyanide, cyclohexylamines, pyridine, quinoline, lutidene, hydroquinoline, and various arylamines and aralkylamines. The cyclic basic compound is added in an amount approximately equivalent to the amount of cuprous cyanide used. The presence of somewhat larger or somewhat smaller amounts has little effect on the cyanation. Large excesses of the cyclic basic compounds are avoided since they may promote by-product formation.

We prefer in many cases to carry out the cyanation in the presence of an inorganic copper compound, such as cuprous chloride or cuprous bromide. This compound is added in the amount of approximately 0.2–1.0 mole per mole of cuprous cyanide.

The hydrolysis procedure that we prefer to use for the conversion of trichlorobenzonitriles to trichlorobenboic acids involves two steps. In the first step trichlorobenzonitrile is partially hydrolyzed with aqueous sulfuric acid while dissolved in a solvent, such as acetic acid, to form trichlorobenzamides. In the second step the trichlorobenzamides are treated with nitrous acid to convert them to trichlorobenzoic acids. The nitrous acid may be added to the reaction mixture as such or it may be formed in situ by adding a compound, for example, a salt of nitrous acid, which will react in water to form nitrous acid.

In accordance with this invention the conversion of 1,2,3,4-tetrachlorobenzene to a mixture of trichlorobenzoic acids containing a substantial amount of the 2,3,6-isomer can be carried out successfully without isolation of the intermediate products. The products of each of the steps may, however, be isolated and purified before being used in the subsequent step.

The example that follows illustrates one way in which the present invention may be carried out. It is to be understood that the invention is not limited to the particu-

Example

A mixture of 21.6 grams (0.10 mole) of 1,2,3,4-tetrachlorobenzene, 14.3 grams (0.05 mole) of cuprous bromide, 17.9 grams (0.10 mole) of cuprous cyanide, and 39.0 grams (0.30 mole) of quinoline was heated with stirring at approximately 180° C. for 4.5 hours. After cooling to 90° C. and dilution with 150 ml. of benzene, the reaction mixture was heated at reflux temperature for one hour and then filtered to separate the copper salts from the organic material. The salts were washed with hot benzene. The benzene solution was combined with the benzene washings and then washed with water, acidified with 10% hydrochloric acid, and washed again with water until neutral. After removal of the benzene by distillation, 18.0 grams of crude trichlorobenzonitrile was obtained.

To the crude trichlorobenzonitrile was added a mixture of 250 grams of concentrated sulfuric acid, 63 grams of glacial acetic acid, and 69 grams of water. The hydrolysis was carried out by heating the reaction mixture with stirring at 110° C. for 30 minutes and then at 158° C. for 4 hours. The acidic reaction mixture which contained trichlorobenzamides dissolved in acetic acid was cooled to 10° C. in an icebath and treated with a solution consisting of 4 grams of sodium nitrite in 10 ml. of water. This solution was added slowly through a tube extending below the surface of the reaction mixture. During the addition the reaction mixture was stirred rapidly. The reaction mixture was warmed at 70° C. on a steambath to complete the reaction. It was then cooled, diluted with 200 ml. of water, and extracted with two 75 ml. portions of benzene. After filtration the benzene solution was washed with water and then with 5% sodium hydroxide solution. The alkaline solution was filtered and acidified with hydrochloric acid. The crude trichlorobenzoic acid that precipitated was purified by means of a procedure which involved dissolving it in dilute sodium hydroxide solution, adjusting the pH to 7 with hydrochloric acid, treating the neutral solution at its boiling point with activated carbon and then filtering, cooling, and acidifying the solution with hydrochloric acid. The precipitated acid was separated and the above-described purification procedure repeated. After drying, 6.7 grams (0.029 mole) of trichlorobenzoic acid was obtained which contained 63% of the 2,3,6-isomer, 27% of the 2,3,4-isomer, 6.5% of the 2,3,5-isomer, and 2.4% of the 2,4,5-isomer.

From the benzene solution from which the trichlorobenzoic acid had been extracted was recovered 6 grams (0.028 mole) of 1,2,3,4-tetrachlorobenzene.

We claim:

1. The method of producing trichlorobenzoic acid containing 2,3,6-trichlorobenzoic acid comprising the steps of heating at a temperature between 165° and 195° C. 1,2,3,4-tetrachlorobenzene with cuprous cyanide and a cyclic basic compound selected from the group consisting of benzonitrile, benzyl cyanide, cyclohexylamine, pyridine, quinoline, lutidene, and hydroquinoline, approximately 1 mole of cuprous cyanide and 1 mole of said basic compound being present for each mole of 1,2,3,4-tetrachlorobenzene, to form a mixture of trichlorobenzonitriles containing more than 60% of 2,3,6-trichlorobenzonitrile and thereafter hydrolyzing said mixture of trichlorobenzonitriles to form trichlorobenzoic acids containing more than 60% of 2,3,6-trichlorobenzoic acid.

2. The method of producing trichlorobenzoic acid containing at least 60% of 2,3,6-trichlorobenzoic acid comprising the steps of heating at a temperature between 165° and 195° C. 1,2,3,4-tetrachlorobenzene, cuprous cyanide, a cuprous halide selected from the group consisting of cuprous chloride and cuprous bromide, and a cyclic basic compound selected from the group consisting of benzonitrile, benzyl cyanide, cyclohexylamine, pyridine, quinoline, lutidene, and hydroquinoline, approximately 1 mole of cuprous cyanide, 0.2 to 1.0 mole of cuprous halide, and 1 mole of said basic compound being present for each mole of 1,2,3,4-tetrachlorobenzene, to form a mixture of trichlorobenzonitriles containing at least 60% of 2,3,6-trichlorobenzonitrile, and thereafter hydrolyzing said mixture of trichlorobenzonitriles to form a mixture of trichlorobenzoic acids containing at least 60% of 2,3,6-trichlorobenzoic acid.

3. The method of producing trichlorobenzoic acid containing 2,3,6-trichlorobenzoic acid comprising the steps of reacting at a temperature between 165° and 195° C. 1,2,3,4-tetrachlorobenzene with cuprous cyanide, a cuprous halide selected from the group consisting of cuprous chloride and cuprous bromide, and pyridine, at least 1 mole of cuprous cyanide, 0.2 mole of cuprous halide, and 1 mole of pyridine being present for each mole of 1,2,3,4-tetrachlorobenzene, to form a mixture of trichlorobenzonitriles containing more than 60% of 2,3,6-trichlorobenzonitrile, heating the trichlorobenzonitriles with aqueous sulfuric acid and acetic acid to form a mixture of trichlorobenzamides, and reacting said mixture of trichlorobenzamides with nitrous acid to form trichlorobenzoic acid containing more than 60% of 2,3,6-trichlorobenzoic acid.

4. The method of producing trichlorobenzoic acid containing 2,3,6-trichlorobenzoic acid comprising the steps of heating at a temperature of approximately 180° C. 1,2,3,4-tetrachlorobenzene with cuprous cyanide, cuprous bromide, and quinoline, at least 1 mole of cuprous cyanide, 0.2 mole of cuprous bromide, and 1 mole of quinoline being present for each mole of 1,2,3,4-tetrachlorobenzene, to form a mixture of trichlorobenzonitriles containing more than 60% of 2,3,6-trichlorobenzonitrile, heating the trichlorobenzonitriles with aqueous sulfuric acid and acetic acid to form a mixture of trichlorobenzamides, and reacting the trichlorobenzamides with nitrous acid to form trichlorobenzoic acid containing more than 60% of 2,3,6-trichlorobenzoic acid.

5. The method of producing 2,3,6-trichlorobenzoic acid comprising the steps of reacting at a temperature of approximately 180° C. 1,2,3,4-tetrachlorobenzene with cuprous cyanide, cuprous bromide, and quinoline, in the amounts of approximately 1 mole of cuprous cyanide, 0.5 mole of cuprous bromide, and 1 mole of quinoline for each mole of 1,2,3,4-tetrachlorobenzene, to form a mixture of trichlorobenzonitriles containing more than 60% of 2,3,6-trichlorobenzonitrile, heating the trichlorobenzonitriles with aqueous sulfuric acid and acetic acid to form a mixture of trichlorobenzamides, reacting the trichlorobenzamides with nitrous acid to form a mixture of trichlorobenzoic acids containing more than 60% of 2,3,6-trichlorobenzoic acid, and thereafter separating 2,3,6-trichlorobenzoic acid from the mixture of trichlorobenzoic acids.

6. The process of producing trichlorobenzonitrile containing 2,3,6-trichlorobenzonitrile comprising cyanating 1,2,3,4-tetrachlorobenzene with cuprous cyanide and a cyclic basic compound selected from the group consisting of benzonitrile, benzyl cyanide, cyclohexylamine, pyridine, quinoline, lutidene, and hydroquinoline, approximately 1 mole of cuprous cyanide and 1 mole of said cyclic basic compound being present for each mole of 1,2,3,4-tetrachlorobenzene, at a temperature in the range of 165-195° C., thereby replacing one of the chlorine atoms of the tetrachlorobenzene with a CN group and forming a mixture of isomers of trichlorobenzonitrile containing more than 60% of 2,3,6-trichlorobenzonitrile.

7. The process of producing trichlorobenzonitrile containing 2,3,6-trichlorobenzonitrile comprising reacting at a temperature between 165° and 195° C. 1,2,3,4-tetrachlorobenzene with cuprous cyanide, a cuprous halide selected from the group consisting of cuprous chloride and cuprous bromide, and quinoline, at least 1 mole of cuprous cyanide, 0.2 mole of cuprous halide, and 1 mole of quinoline being present for each mole of 1,2,3,4-tetrachlorobenzene, to form a mixture of isomers of trichlorobenzonitrile containing more than 60% of 2,3,6-trichlorobenzonitrile.

8. The process of producing trichlorobenzonitrile containing 2,3,6-trichlorobenzonitrile comprising reacting at a temperature of approximately 180° C. 1,2,3,4-tetrachlorobenzene with cuprous cyanide, cuprous bromide, and quinoline in the amounts of approximately 1 mole of cuprous cyanide, 0.5 mole of cuprous bromide, and 1 mole of quinoline for each mole of 1,2,3,4-tetrachlorobenzene to form a mixture of trichlorobenzonitriles containing more than 60% of 2,3,6-trichlorobenzonitrile.

References Cited in the file of this patent

Wagner and Zook, "Synthetic Organic Chemistry," 1953, page 591.